United States Patent [19]

Simone

[11] Patent Number: 5,388,850
[45] Date of Patent: Feb. 14, 1995

[54] CONVERTIBLE SULKY

[76] Inventor: Nicholas Simone, 2225 Hwy. A1A, Unit 604, Indian Harbour Beach, Fla. 32937

[21] Appl. No.: 66,782
[22] Filed: May 24, 1993
[51] Int. Cl.⁶ .............................................. B62B 1/06
[52] U.S. Cl. ............................ 280/442; 56/16.7; 56/DIG. 14; 180/19.1; 280/32.7; 280/63
[58] Field of Search ................... 56/2, 11.1, 10.1, 11.3, 56/14.7, 15.4, 15.6, 15.7, 15.8, 16.2, 17.4, DIG. 9, DIG. 22; 280/32.7, 63, 64, 65, 278, 442

[56] References Cited

U.S. PATENT DOCUMENTS

| | | | |
|---|---|---|---|
| 4,192,525 | 3/1980 | Clark | 280/32.7 |
| 4,899,524 | 2/1990 | Eilles | 56/17.2 |
| 4,998,948 | 3/1991 | Osterling | 56/12.2 |
| 5,118,123 | 6/1992 | Betrock | 280/32.7 |
| 5,181,370 | 1/1993 | Simone | 56/14.7 |

Primary Examiner—Ramon S. Britts
Assistant Examiner—Pamela Anne O'Connor
Attorney, Agent, or Firm—Charles E. Wands

[57] ABSTRACT

A convertible sulky is interchangeable between stand-up and sit-down configurations so as to allow a mower operator to operate the mower from either a standing or seated position behind the mower. The convertible sulky comprises an H-shaped support wheelbase frame, to opposite legs of which a pair of wheel-mounting columns are affixed. Attached to the H-shaped support wheelbase frame member is a T-shaped mower attachment frame, having a central leg, an upper end of which is inclined forwardly H-shaped support wheelbase frame for attachment with the rear of the mower, by means of a ball-hitch fixture. A pair of generally L-shaped foot plates are secured to the frame structure formed by the T-shaped mower attachment frame and the H-shaped support wheelbase frame. A removable seat attachment comprises a column member having a first leg portion at a lower end thereof, sized for insertion into the second, lower end of the central leg of the T-shaped mower attachment frame, and a second leg portion at an upper end thereof. The second leg portion of the seat attachment extends horizontally from the column portion and receives one leg of a U-shaped seat spring member, to which a seat is attached.

9 Claims, 7 Drawing Sheets

CONVERTIBLE SULKY

FIELD OF THE INVENTION

The present invention relates in general to walk-behind rotary mowers and is particularly directed to a new and improved sulky for a walk-behind rotary mower, the sulky having an interchangeable stand-up/sit-down configuration that enables the sulky to be readily converted from a stand-up unit to a sit-down unit, or vice versa, so that an operator is able to comfortably operate the mower control handle and steer the mower from either a standing or seated position behind the mower.

BACKGROUND OF THE INVENTION

Lawn and landscaping services customarily employ a diversity of cutting and trimming equipment in order to accommodate the demands of the job site and to attain a high level of productivity. To handle the most common task of cutting ground cover, a commercial service usually maintains an inventory of multiple sized rotary mowers and will typically operate the largest sized mower that can be practically used for the job. Although maximum coverage is obtained by the use of large capacity riding mowers, they cannot be used in all applications. This fact, coupled with the substantial cost of such equipment, has led many commercial services to rely heavily on the use of mid-size, walk-behind rotary mowers. Mid-size walk-behind mowers are popular among commercial cutters because they have the maneuverability of a standard twenty-one inch walk-behind mower when working in tight areas, and the power and cutting capacity of a lawn tractor for large areas.

Because mid-size mowers are fairly heavy and cumbersome pieces of equipment, the operator often employs a rear-end attachment, commonly referred to the industry as a sulky—a one or two-wheeled stand-up or seat device—that allows the operator to ride behind the mower in a reasonably comfortable standing or seated position during prolonged operation of the mower. In a stand-up sulky, the operator stands upon a floor or base frame, typically comprised of a single floor member of a pair of foot plates. In a sulky that has a seat attachment, the operator sits in an upright position upon a seat that is customarily mounted at the rear of the sulky, with the operator's feet resting upon a floor or base frame.

A major shortcoming of such conventional sulky configurations is the fact that they are configured for specific set of mower parameters, being non-adjustable both in terms of the size and position of the operator and with respect to the type of mower with which they may be safely and comfortably used.

SUMMARY OF THE INVENTION

In accordance with the present invention, these drawbacks are obviated by means of a convertible sulky which is readily interchangeable between stand-up and sit-down configurations, so that an operator is able to comfortably operate the mower control handle and steer the mower from either a standing or seated position behind the mower. The convertible sulky configuration of the present invention comprises an H-shaped support wheelbase frame, to opposite legs of which a pair of wheel-mounting columns are affixed. Each wheel-mounting has a plurality of axle slots to accommodate the mounting of a respective wheel at a plurality of (vertically) spaced apart locations, thereby, allowing the support wheelbase frame member to be vertically adjustable with respect to the mower and to accommodate multiple sizes of wheels. Attached to the H-shaped support wheelbase frame member is a T-shaped mower attachment frame, having a central leg, a first, upper end of which is inclined forwardly H-shaped support wheelbase frame for attachment with the rear of the mower, by means of a ball-hitch fixture.

A second, lower end of the central leg is affixed to a cross-T portion of the T-shaped mower attachment frame. Opposite ends of the cross-T portion of the T-shaped mower attachment frame are affixed to respective legs of the H-shaped support wheelbase frame. The central leg of the T-shaped mower attachment frame is also attached to the inclined forwardly H-shaped support wheelbase frame, so that the T-shaped mower attachment frame and the H-shaped support wheelbase frame together form a sturdy frame structure for supporting both a pair of foot rest plates upon which an operator may stand or rest his feet while seated, and for receiving and supporting a seat attachment.

The pair of foot plates are generally L-shaped components having a forward portion which is bent upwardly from a rearward, foot-receiving plate portion. The foot-receiving plate portion has a tread region for preventing or minimizing the operator's foot from slipping. Side edge portions of each foot plate are also bent or 'wrapped' upwardly into side-to-side edge guards for the operator's feet. The upwardly bent forward portions of each foot plate provides a protective barrier in front of the operator's feet and allows the footplates to be fixedly attached to the central leg of the T-shaped mower attachment frame. The foot-receiving plate portions of the footplates are secured to the frame structure formed by the integrated T-shaped mower attachment frame and the H-shaped support wheelbase frame.

The seat attachment comprises a column member having a first leg portion at a lower end thereof, sized for insertion into the second, lower end of the central leg of the T-shaped mower attachment frame, and a second leg portion at an upper end thereof. The first leg portion of the seat attachment is oriented at an acute angle with respect to the column member so that, when the first leg portion of the seat attachment is inserted into the second, lower end of the central leg of the T-shaped mower attachment frame, the column member of the seat attachment is oriented vertically with respect to the integrated T-shaped mower attachment frame and H-shaped support wheelbase frame. The second leg portion of the seat attachment extends horizontally from the column portion and receives one leg of a U-shaped seat spring member, to a selected one of a plurality of spaced apart attachment locations of a second leg of which a seat is attached. Because the seat is attachable to a number of spaced apart locations of the second leg of the U-shaped seat spring member, the seat is effectively horizontally adjustable with respect to the rear of the mower.

When inserted into the lower end of the central leg of the T-shaped mower attachment frame, the seat attachment is held in place by means of a pin, bolt or the like, which passes through aligned holes in each of the first leg portion of the seat attachment and the second, lower end of the central leg of the T-shaped mower attachment frame. For stability, the lower end of the column portion of the seat attachment has a cross-piece affixed thereto, which abuts against the cross-T portion of the T-shaped mower attachment frame and the foot plates.

DETAILED DESCRIPTION

Figure 1:
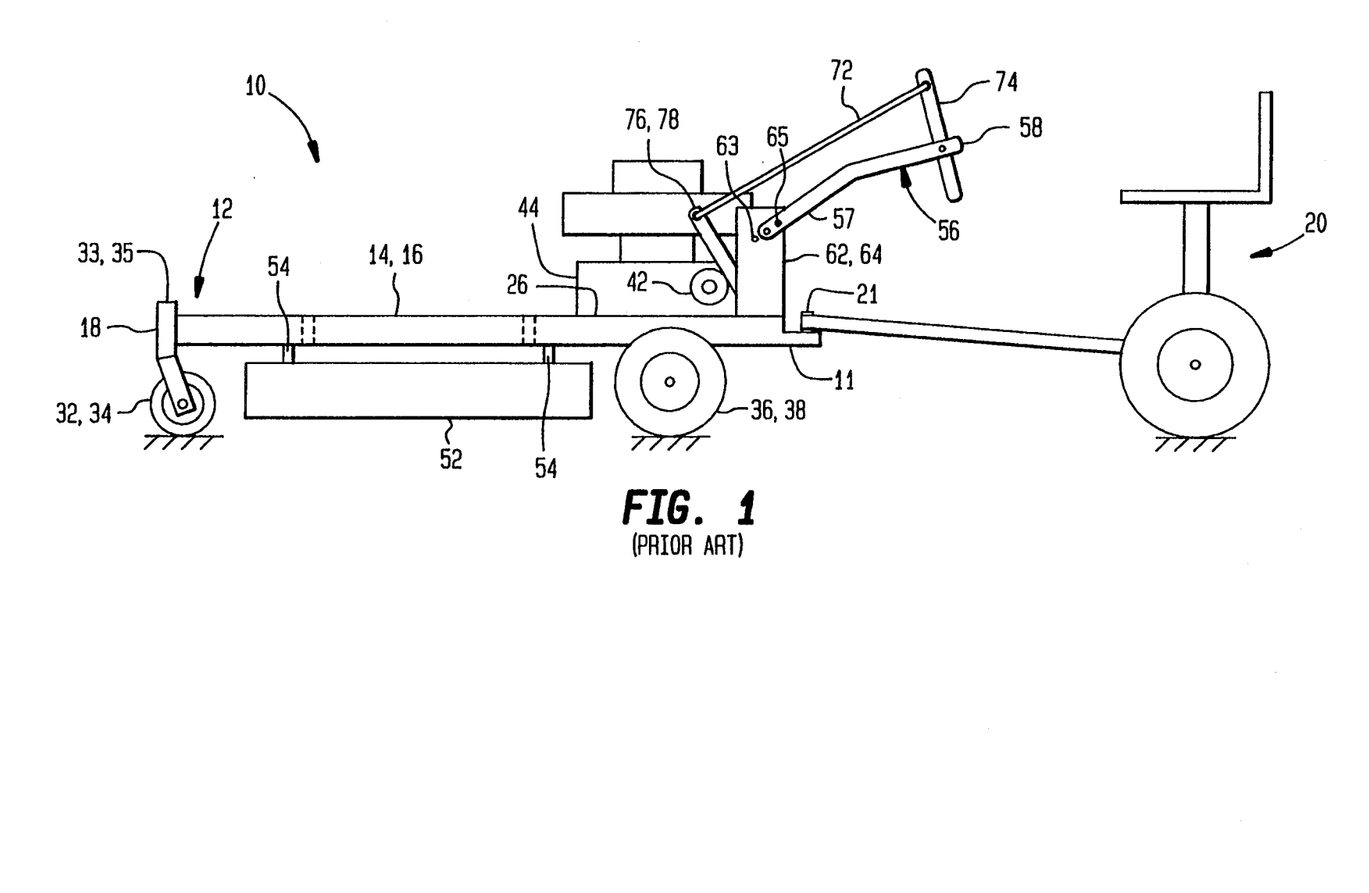
FIGS. 1 and 2 diagrammatically illustrate respective side and top views of the configuration of a mid-sized, walk behind rotary mower and a riding sulky attached to the rear of the mower.
Figure 2:
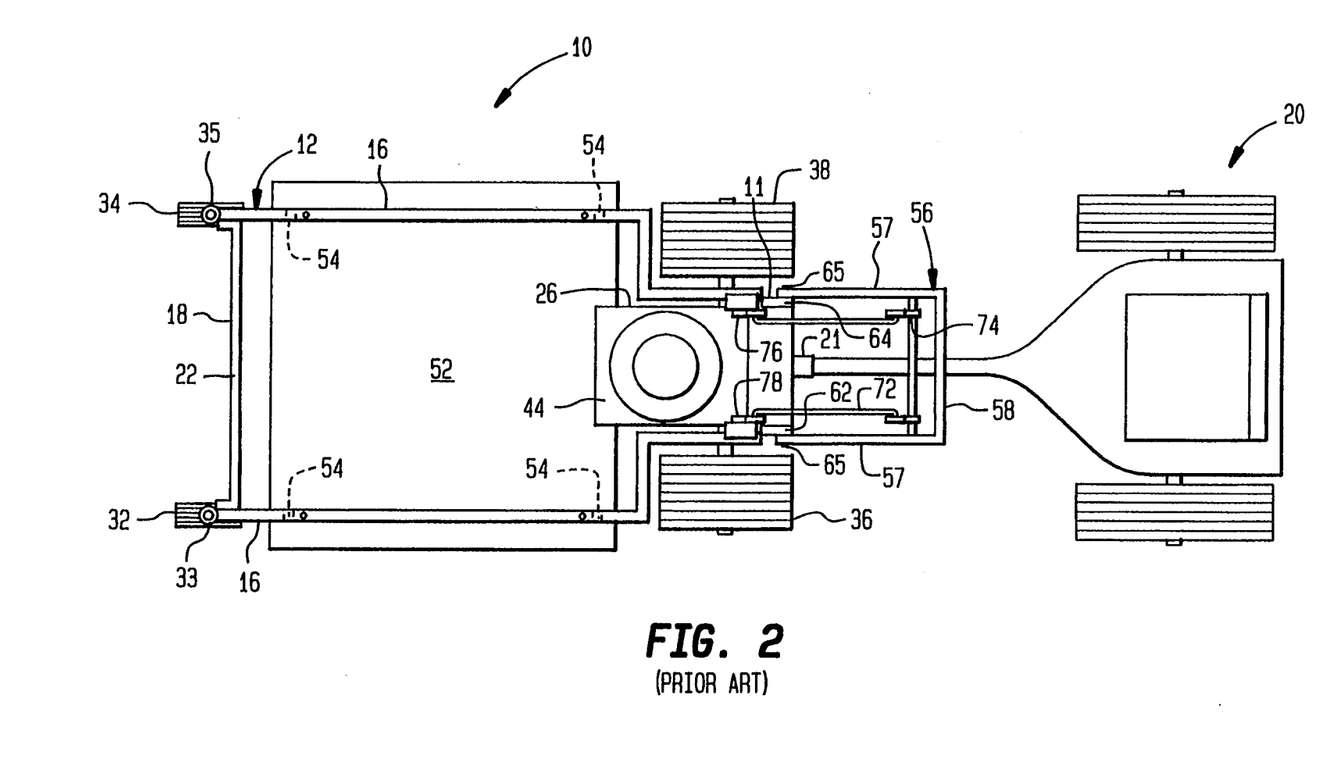

As pointed out above, the convertible sulky of the present invention is designed to be used with a variety of commercially available (mid-size) walk-behind mowers of conventional construction. As a non-limitative example, the sulky may be used with any of the ProLine 30000 series manufactured by the Toro Company. As is normally understood in the trade, a mid-size, walk-behind, rotary mower typically has a cutting deck diameter in a range of from 32 to 62 inches. FIGS. 1 and 2 show, in simplified diagrammatic form, respective side and top views of the basic configuration of such a walk-behind rotary mower 10, together with a sulky 20, which is coupled, by means of a pivotable attachment fixture 21, to the rear end 11 of mower 10.

The mower itself has a mainframe 12, comprised of a pair of spaced apart side rails or channels 14, 16 which are joined at the front end 18 of the mower by a cross channel 22 and at the rear end 11 of the mower to an engine frame bed 26. The mower's front end 18 is supported by way of a first pair of wheels 32 and 34, that are pivotable about respective wheel mounts, while the rear end 11 is supported by a second pair of larger, drive wheels 36 and 38. Drive wheels 36 and 38 are coupled by means of a transmission unit 42 to the output shaft of a motor 44, which is mounted to the engine frame bed 26. A rotary blade cutting deck 52 is supported by means of attachments 54 to the mainframe 12 between the front and rear ends of the mower, and contains one or more rotary blades (not shown), which are mounted for rotation beneath the cutting deck and are coupled via rotary blade drive linkage to the motor 44.

The mower is controlled by an operator control handle 56, lower ends of the legs 57 of which are mounted to a pair of vertical brackets 62, 64, attached to a rear region of the engine frame bed 26. The upper end of control handle 56 extends behind the mower, thereby permitting its operation to be controlled by an operator at the rear of the mower. When the sulky 20 is not attached to the mower, the operator walks directly behind the control handle 56. When the sulky 20 is attached to the rear of the mower, the operator rides on the sulky and operates the control handle 56 from a seated position (or in the case of a stand-up only sulky having no seat, operates the control handle from a standing position).

Each of control handle mounting brackets 62, 64 has a plurality of attachment holes 63 where a lower end of a respective leg of the handle is attached by suitable bolt/cotter pin fasteners 65. The control handle customarily carries a pair of steering control rods 72 which engage a steering bar 74 at the upper end of the handle. Where the mower drive mechanism employs a belt control drive, control rods 72 are coupled to a pair of levers 76, 78 rotationally mounted to brackets 62, 64 adjacent to the lower end of the handle. In the case of a belt-controlled mower drive, each lever retains a respective belt roller (not shown) around which a drive wheel control belt (not shown) passes. Where the mower drive mechanism employs a hydrostatic control drive, the lower ends of the control rods are coupled to respective control elements of respective hydrostatic drive units (not shown).

Control handle 56 may also contain motor speed and/or forward/reverse controls at its upper end 58 for controlling the operation of the mower engine and the transmission unit. Alternatively, a forward/reverse control lever may be mounted to a bracket located directly behind the motor and accessible by the operator by reaching down past or through the legs of the control handle. Such control elements are typically coupled the engine and transmission by way of metallic cabling and a wiring harness.

Figure 3:
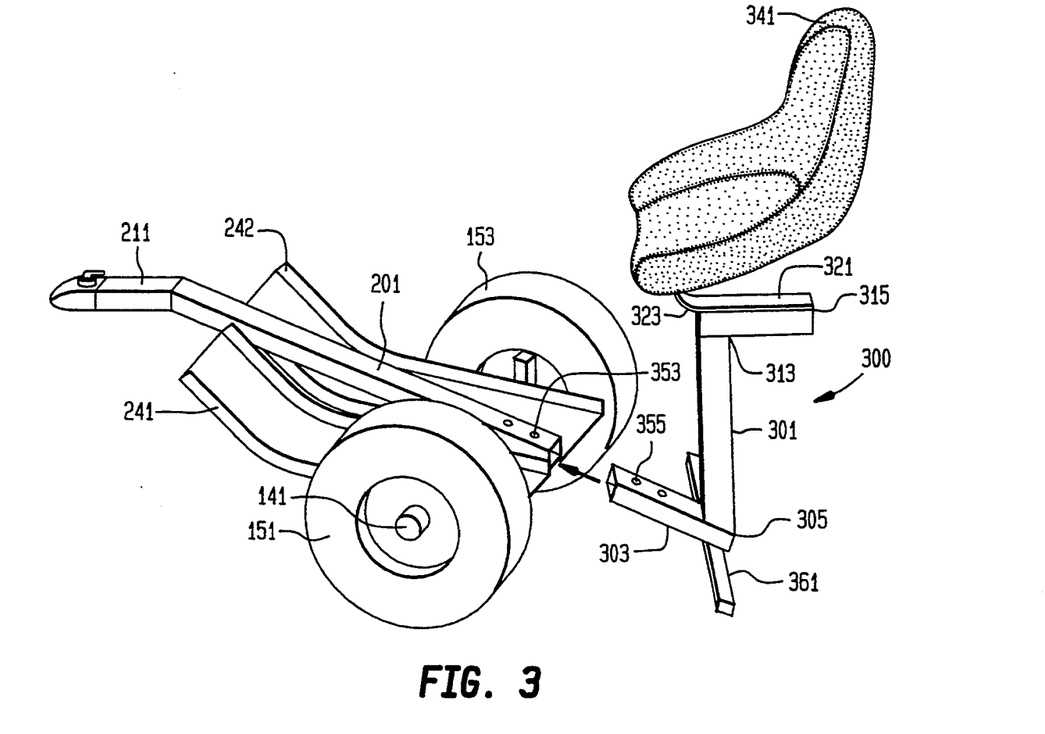
FIGS. 3 and 4 diagrammatically illustrate respective left side and left rear views of a convertible sulky in accordance with an embodiment of the present invention.
Figure 4:
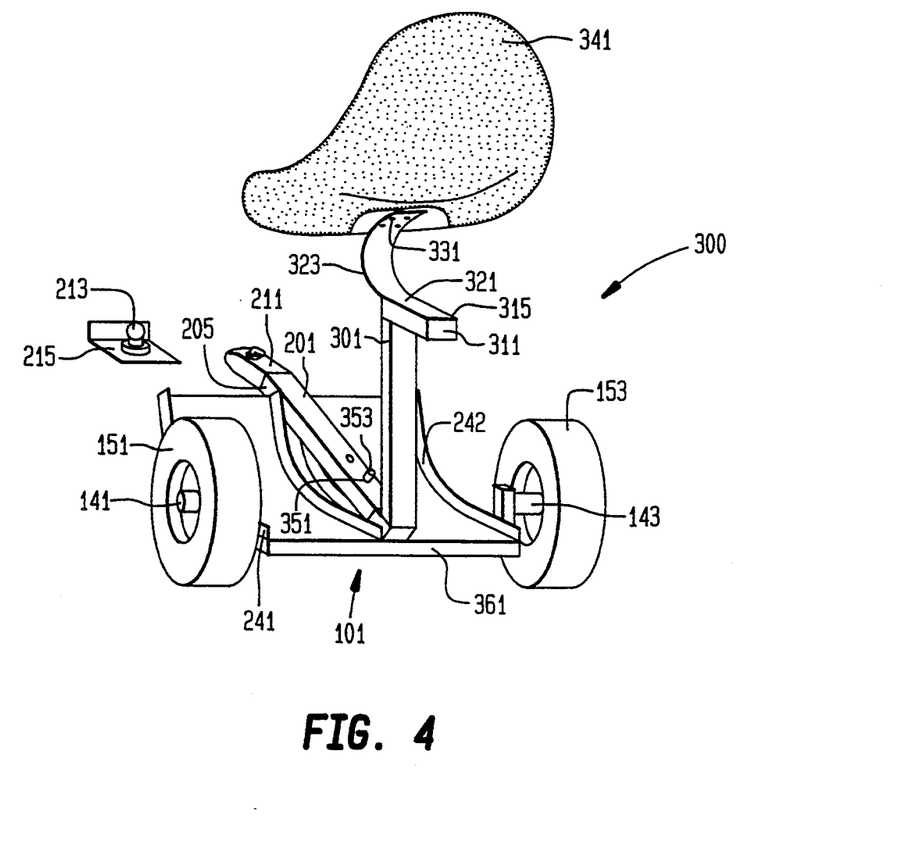

FIGS. 3 and 4 diagrammatically illustrate respective left side and left rear views of the configuration of a convertible sulky in accordance with an embodiment of the present invention, which is readily interchangeable between stand-up and sit-down configurations, so that the mower operator is able to comfortably operate the mower control handle and steer the mower from either a standing or seated position behind the mower.

Figure 5:
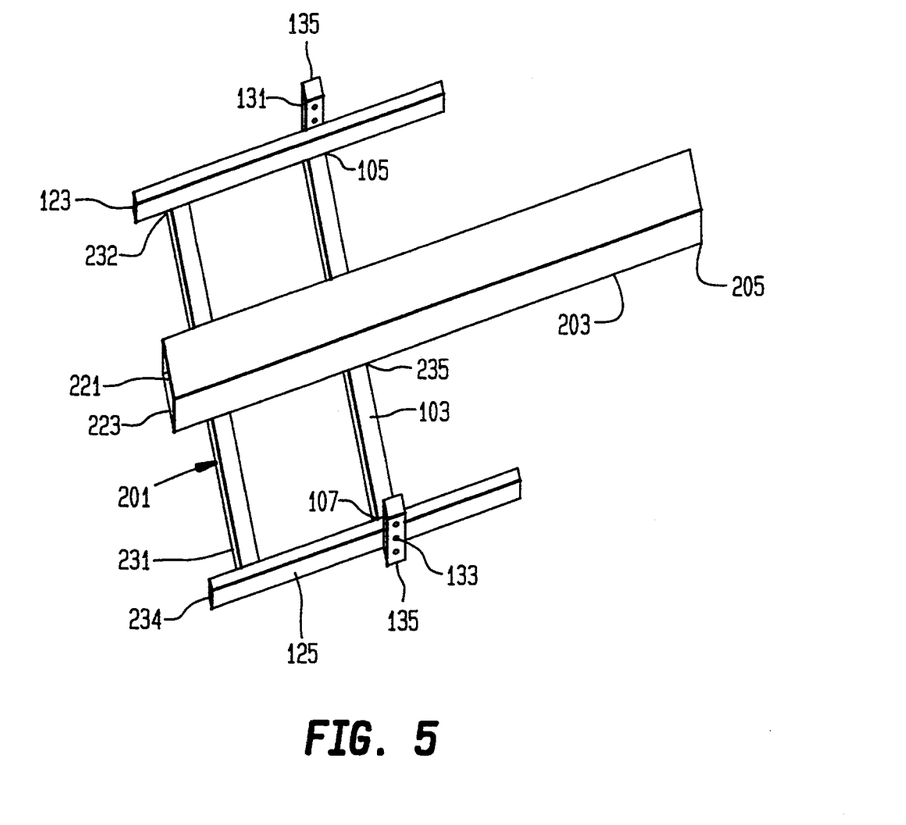
FIG. 5 is a detailed illustration of an H-shaped support wheelbase frame and a T-shaped mower attachment frame of the convertible sulky of FIGS. 3 and 4.

More particularly, the convertible sulky configuration of the present invention comprises an H-shaped support wheelbase frame 101, shown in detail in FIG. 5 as comprising a cross-bar section of rectangular cross-section steel tubing 103 to opposite ends 105 and 107 of which a pair of parallel leg members 123 and 125, also comprised of respective sections of rectangular cross-section steel tubing, are welded. Mounted (welded) to and extending orthogonally (vertically) from the respective leg members 123 and 125 of H-shaped support wheelbase frame 101 are a pair of wheel-mounting columns 131 and 133, each of which is also comprised of a respective section of rectangular cross-section steel tubing, shown as having a diameter larger than that of sections 103, 123 and 125.

Each of wheel-mounting columns 131 and 133 has a plurality of bores or axle slots 135 sized to accommodate the insertion and mounting of the axle 141, 143 of a respective wheel 151, 153 at a selected one of plurality of (vertically) spaced apart locations, in each (vertical) column, thereby enabling the sulky to be used with different sized wheels and allowing the support wheelbase frame member 101 to be vertically adjustable with respect to the mower 10.

Attached to the H-shaped support wheelbase frame member 101 is a T-shaped mower attachment frame 201 which, like frame 101, is comprised of respective sections of rectangular cross-section steel pipe or tubing. Frame member 201 has a central leg 203, a first, upper end 205 of which is inclined forwardly of H-shaped support wheelbase frame 101 for attachment with the rear end of the mower 10. For this purpose, central leg 203 preferably is provided with a ball-hitch fixture 211, which is sized to engage a corresponding ball-hitch ball element 213 mounted on the rear of the mower 10, as diagrammatically illustrated at 215 in FIG. 4.

A second, lower end 221 of the central leg 203 of T-shaped mower attachment frame 201 is welded at 223 to a cross-T portion 231 of the T-shaped mower attachment frame 201. Opposite ends 232, 234 of the cross-T portion 231 of the T-shaped mower attachment frame 201 are welded to the respective legs 123, 125 of the H-shaped support wheelbase frame 101. The central leg 203 of the T-shaped mower attachment frame 201 is also welded at 235 to the H-shaped support wheelbase frame, so that the welded-together, T-shaped mower attachment frame 201 and H-shaped support wheelbase frame 101 form a sturdy supporting structure for the mower operator. Welded to this support structure are a pair of foot plates 241, 242 upon which an operator may stand or rest his feet while seated.

Figure 6:
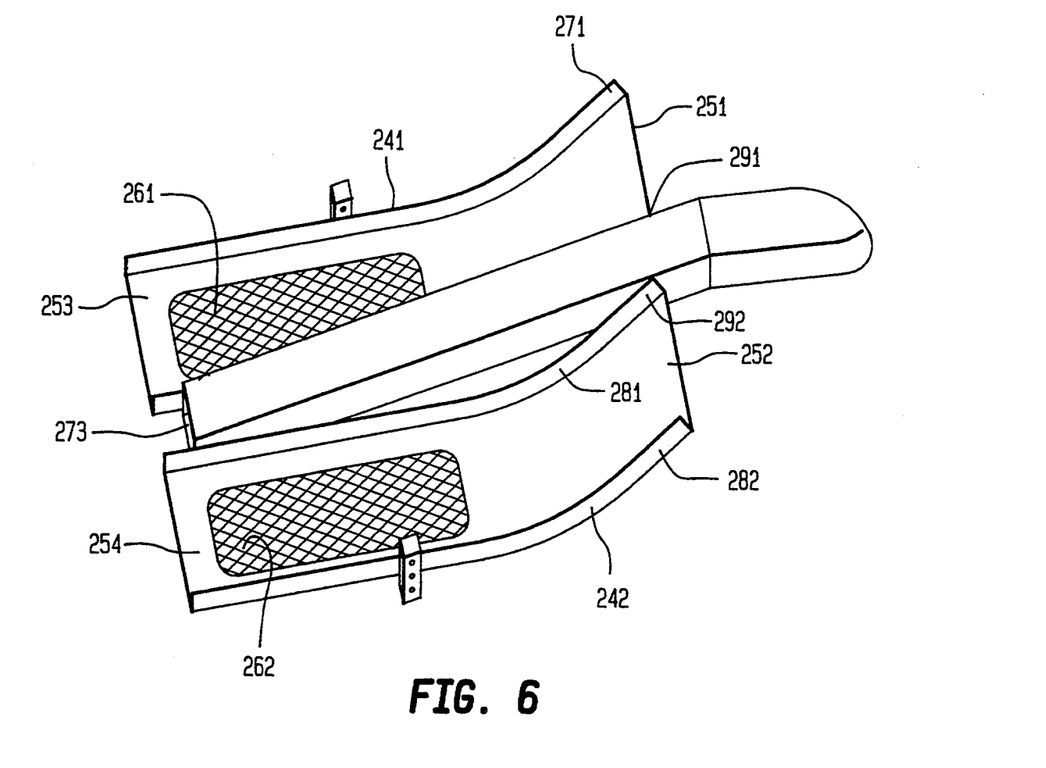
FIG. 6 shows details of a pair foot plates of the convertible sulky of the present invention.

As shown in greater detail in FIG. 6, foot plates 241, 242 are preferably comprised of respective sections of steel sheet, each of which is formed into a generally L-shaped configuration, so as to have forward portions 251, 252 which are bent upwardly from lower plate portions 253, 255 upon which the operator stands or rests his feet while sitting. The lower plate portions 253, 254 have respective tread regions 261, 262 for preventing or minimizing the operator's feet from slipping. The upwardly bent forward portions 251, 252 of the foot plates 241, 242 provide protective barriers in front of the operator's feet and facilitate attachment of the footplates to the central leg of the T-shaped mower attachment frame. Side edge portions 271, 272 of foot plate 241 and side edge portions 281, 282 of foot plate 242 are also bent or 'wrapped' upwardly into side-to-side edge guards for the operator's feet. Footplates 241, 242 are secured to the underlying frame structure by welding the lower plate portions 253, 254 to cross-bar section 103 of H-shaped support wheelbase frame 101, and by welding (shown at 291, 292) the upwardly bent forward portions 251, 252 of the foot plates to central leg 203 of the T-shaped mower attachment frame 201.

Figure 7:
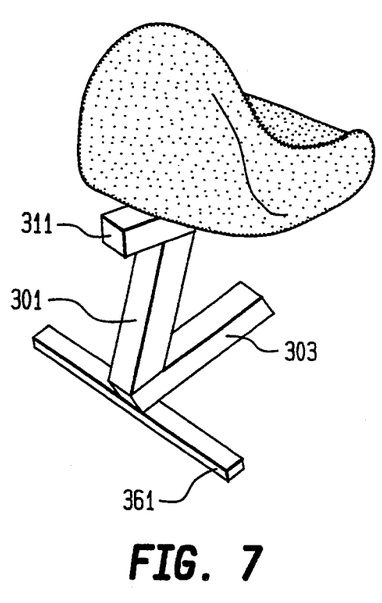
FIG. 7 shows details of a convertible sulky seat attachment.

A seat attachment 300, which is also preferably comprised of respective sections of rectangular cross-section steel pipe or tubing, is shown in detail in FIG. 7 as comprising a column member 301 having a first leg portion 303 welded to a lower end 305 of column member 301. First leg member 303 of seat attachment 300 is sized for insertion into and retention by the lower end 221 of the central leg 203 of the T-shaped mower attachment frame 201. This first leg portion 303 of seat attachment 300 is oriented at an acute angle with respect to the column member 301 so that, when the first leg portion 301 of seat attachment 300 is inserted into the second, lower end 221 of the central leg 203 of the T-shaped mower attachment frame 201, the column member 301 of the seat attachment is oriented vertically with respect to the integrated T-shaped mower attachment frame 201 and H-shaped support wheelbase frame 101.

Seat attachment 300 has a second leg portion 311 welded to an upper end 313 of column member 301, such that second leg portion 311 extends horizontally from column member 301. Welded to the top surface 315 of horizontal leg portion 311 is a first leg 321 of a generally U-shaped seat spring member 323. A second leg 325 of spring member 323 has a plurality of spaced apart attachment holes 331 for attaching a seat 341 to the spring member 323 by means of screws or the like.

Because seat 341 is attachable to any of a number of spaced apart locations 331 of the second leg 325 of the U-shaped seat spring member 323, the seat is effectively horizontally adjustable with respect to the rear of the mower.

When the lower leg portion 303 of the seat attachment 300 is inserted into the lower end 221 of the central leg 203 of the T-shaped mower attachment frame 201, the seat attachment may be held in place by means of a pin, bolt or the like, shown at 351, which passes through respective aligned holes 353, 355 in first leg portion 303 of the seat attachment 300 and the second, lower end 221 of the central leg 203 of the T-shaped mower attachment frame 201.

Although lower leg portion 303 of the seat attachment is sized to be captured by the lower end 221 of central leg 203 of the T-shaped mower attachment frame, for added stability, an additional cross-piece section of rectangular steel tubing 361 is welded to the lower end 305 of the column portion 301 of the seat attachment 300. When the lower leg portion 303 of the seat attachment 300 is inserted into the lower end 221 of the central leg 203 of the T-shaped mower attachment frame 201, cross-piece 361 abuts against the cross-T portion 203 of the T-shaped mower attachment frame 201 and against the overlying foot plates 241, 242.

Because the seat attachment 300 is readily insertible and removable at the lower, rear end of the T-shaped mower attachment frame 201, the convertible sulky of the present invention is readily interchangeable between a stand-up configuration (shown in the left-hand portion of FIG. 3) and a sit-down configuration (shown in the right-hand portion of FIG. 3), so that an operator is able to comfortably operate the mower control handle and steer the mower from either a standing or seated position behind the mower.

As will be appreciated from the foregoing description, the non-adjustability of conventional sulky configurations and their inability to provide multiple operator positions and accomodate a variety of mower parameters are successfully addressed by the convertible sulky of the present invention, which is interchangeable between stand-up and sit-down configurations so as to allow a mower operator to operate the mower from either a standing or seated position behind the mower.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A convertible sulky to be hitched to a walk-behind lawn mower and being interchangeable between stand-up and sit-down configurations, so that a mower operator is able to operate said walk-behind lawn mower from either a standing or seated position in the sulky behind said walk-behind lawn mower, comprising:

a generally T-shaped support frame that includes a central leg member, a first, upper end of said central leg member having a ball-hitch fixture that is attachable to a ball-hitch element on a rear portion of said walk-behind lawn mower, a second, lower end of said central leg member having a first cross member affixed thereto so as to form, with said central leg member, said generally T-shaped support frame, said lower end of said central leg member having a hollow opening for receiving a seat attachment fixture;

a generally H-shaped support wheelbase frame that includes a second cross member and first and second wheel-mounting leg members affixed to opposite ends of said second cross member, said second cross member being affixed to a location along said central leg member between said first and second ends thereof, and wherein said first wheel-mounting leg member is affixed to a first end of said first cross member of said generally T-shaped support frame, and said second wheel-mounting leg member is affixed to a second end of said first cross member of said generally T-shaped support frame;

a first wheel-mounting element affixed to said first wheel-mounting leg member, said first wheel-mounting element having a first wheel axle attachment location which receives and supports a wheel axle of a first wheel, and a second wheel-mounting element affixed to said second wheel-mounting leg member, said second wheel-mounting element having a second wheel axle attachment location which receives and supports a wheel axle of a second wheel;

a floor member affixed to said generally H-shaped and T-shaped support frames, said floor member comprising first and second generally L-shaped foot plates, upon which an operator may stand or place his feet while seated, each first and second generally L-shaped foot plate having a rearward, foot-receiving plate portion, which is affixed to said first and second cross members, a forward portion which extends upwardly from said rearward, foot-receiving plate portion toward said first, upper end of said central leg member, and side edge portions extending upwardly as side-to-side edge guards for the operator's feet; and a seat attachment fixture, which is removably insertable into said hollow opening of said lower end of said central leg member, said seat attachment fixture comprising a column member having a first leg portion, which is affixed to a lower end of said column member and is sized for insertion into said hollow opening of said second, lower end of said central leg member, and a cross-piece affixed to the lower end of said column member, so as to be adjacent to said first cross member affixed to said second, lower end of said central leg member of said generally T-shaped support frame, when said first leg portion affixed to said lower end of said column member of said seat attachment fixture is inserted into said hollow opening at said second, lower end of said central leg member of said generally T-shaped support frame, and an operator seat upon which an operator may sit while operating said walk-behind lawn mower, said operator seat being supported by said column member.

2. A convertible sulky according to claim 1, wherein said seat attachment fixture further comprises a second leg portion affixed to an upper end of said column member and being configured for attachment with a seat spring member to which said operator seat is affixed.

3. A convertible sulky according to claim 2, wherein said foot-receiving plate portion of a respective foot plate has a tread region for preventing or minimizing the operator's foot from slipping.

4. A convertible sulky according to claim 2, wherein each of said first and second wheel-mounting leg members has a plurality of axle attachment locations configured to accommodate the mounting of a respective wheel at a plurality of spaced apart locations, thereby allowing said generally H-shaped support wheelbase frame to be vertically adjustable with respect to said walk-behind lawn mower and to accommodate multiple sizes of wheels.

5. A convertible sulky according to claim 2, wherein said a central leg member of said generally T-shaped support frame comprises a section of rigid tubing, generally rectangular in cross-section, having a first, forward end to which said ball-hitch fixture is affixed, and second, rearward hollow end of which is configured to receive said first leg portion affixed to said lower end of said column member of said seat attachment fixture.

6. A convertible sulky according to claim 5, wherein each of said column member and said first leg portion affixed to said lower end of said column member of said seat attachment fixture comprises a respective section of rigid tubing, the section of rigid tubing of which said first leg portion is comprised being sized to be inserted into and captured by the lower end portion of said central leg member of said generally T-shaped support frame.

7. A convertible sulky according to claim 6, wherein said seat attachment fixture further comprises a second leg portion affixed to an upper end of said column member and being configured for attachment with a seat spring member to which said operator seat is affixed.

8. A convertible sulky according to claim 7, wherein each of said first and second wheel-mounting leg members has a plurality of axle attachment locations configured to accommodate the mounting of a respective wheel at a plurality of spaced apart locations, thereby allowing said generally H-shaped support wheelbase frame to be vertically adjustable with respect to said walk-behind lawn mower and to accommodate multiple sizes of wheels.

9. A convertible sulky according to claim 8, wherein said foot-receiving plate portion of a respective foot plate has a tread region for preventing or minimizing the operator's foot from slipping.

* * * * *